No. 785,171. PATENTED MAR. 21, 1905.
M. A. JONES.
COTTON CHOPPING ATTACHMENT FOR CULTIVATORS.
APPLICATION FILED APR. 16, 1904.
4 SHEETS—SHEET 1.
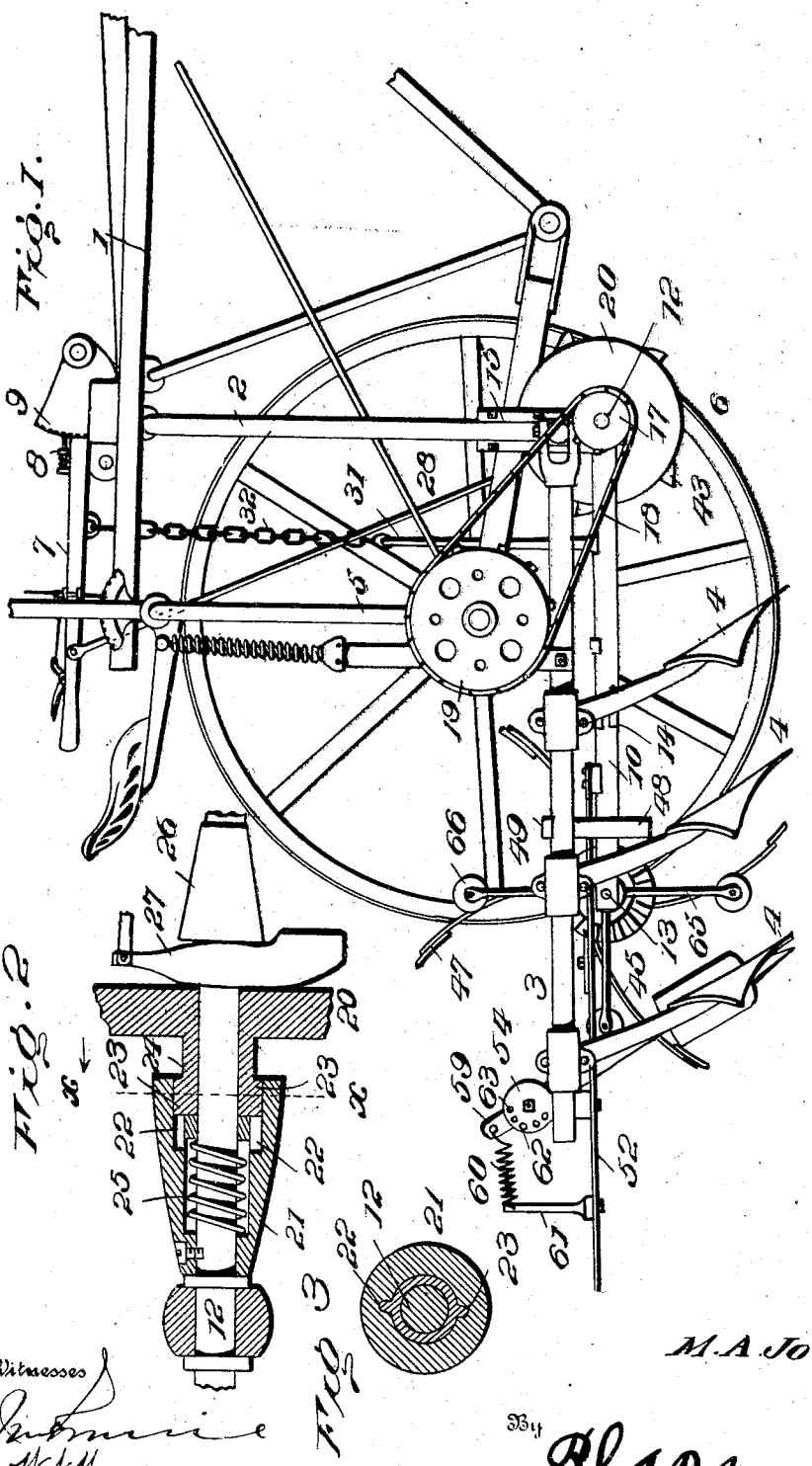
Witnesses
W. N. Woodson
Inventor
M. A. Jones
By R. W. P. Lacey, Attorneys

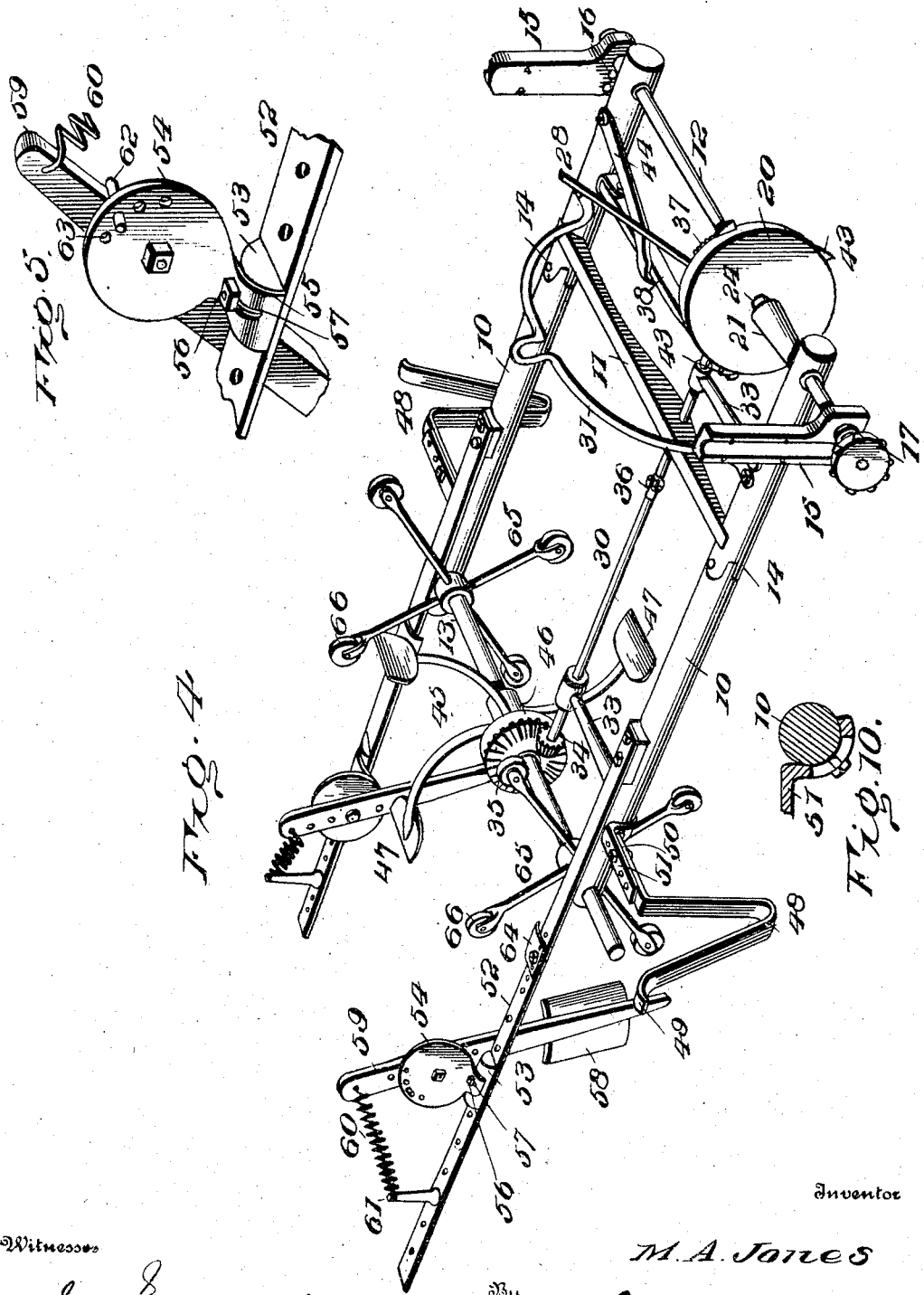

No. 785,171. PATENTED MAR. 21, 1905.
M. A. JONES.
COTTON CHOPPING ATTACHMENT FOR CULTIVATORS.
APPLICATION FILED APR. 16, 1904.
4 SHEETS—SHEET 3.
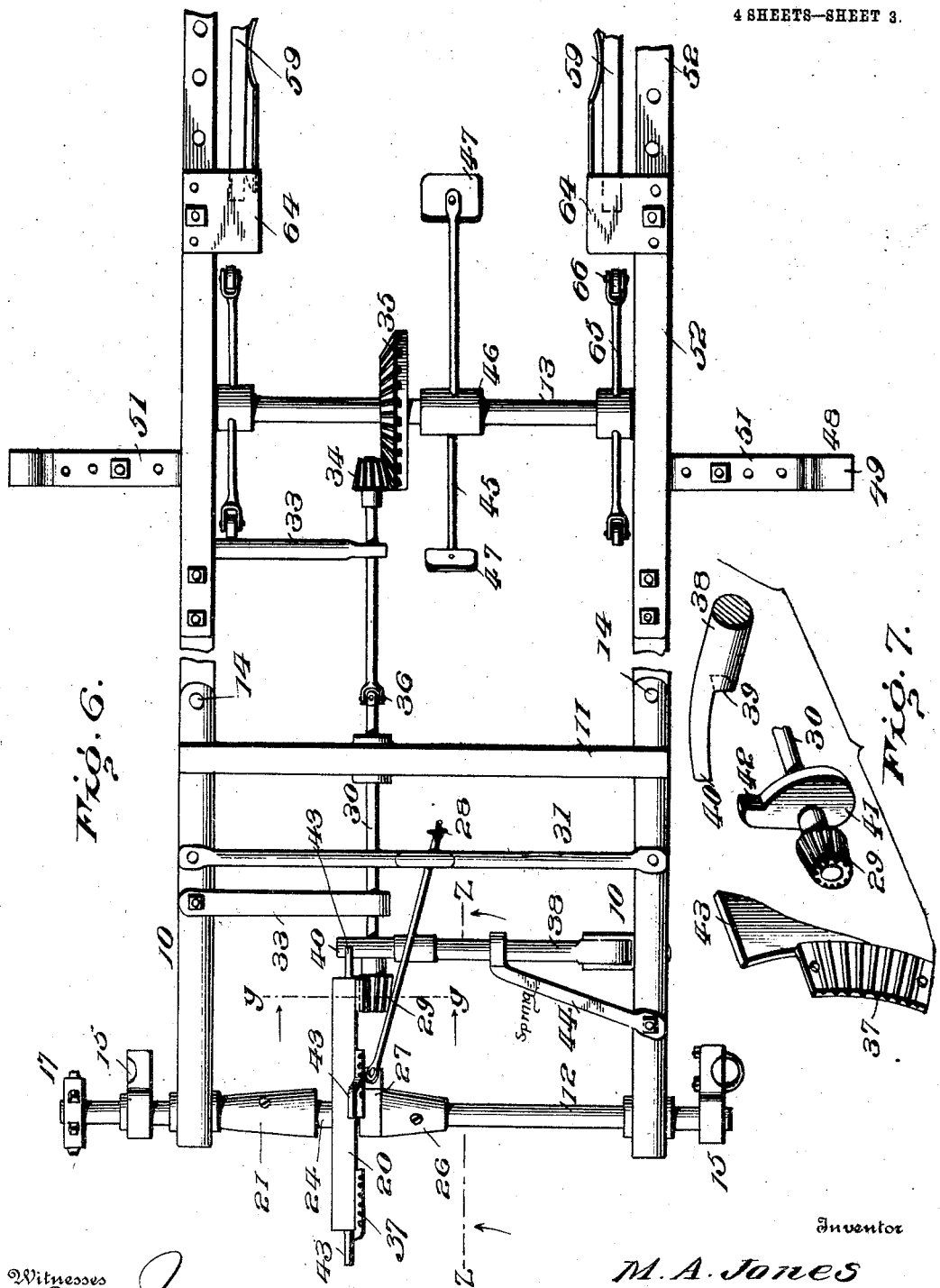
Inventor
M. A. Jones
Witnesses
By R. W. A. Blacey, Attorneys

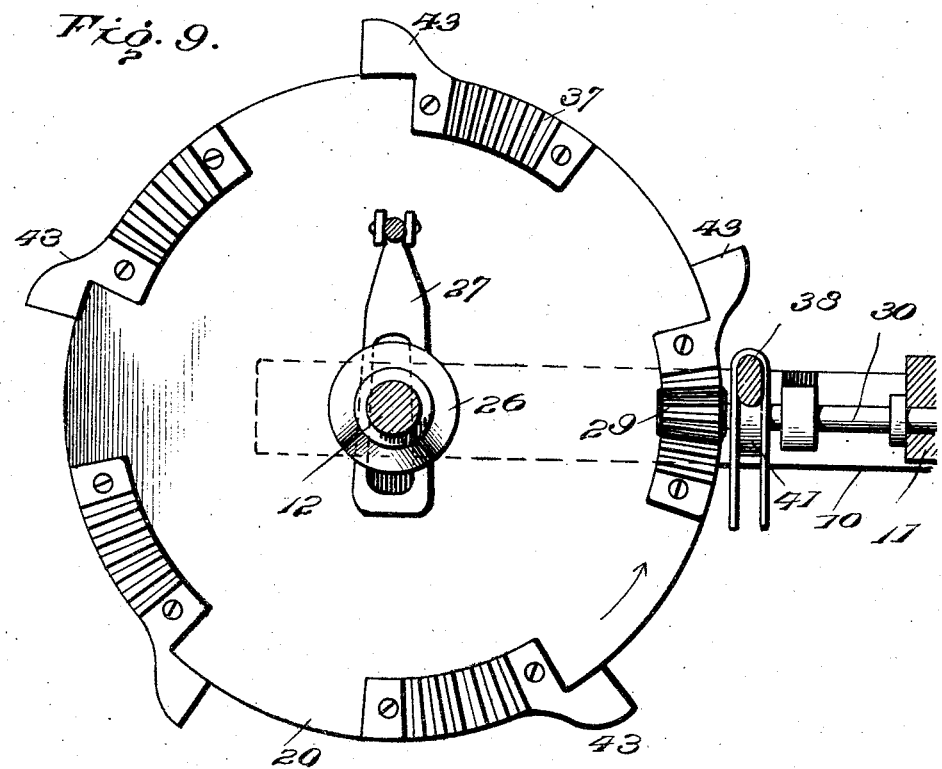

No. 785,171.

Patented March 21, 1905.

UNITED STATES PATENT OFFICE.

MARTIN A. JONES, OF OGLESBY, TEXAS.

COTTON-CHOPPING ATTACHMENT FOR CULTIVATORS.

SPECIFICATION forming part of Letters Patent No. 785,171, dated March 21, 1905.

Application filed April 16, 1904. Serial No. 203,507.

*To all whom it may concern:*

Be it known that I, MARTIN A. JONES, a citizen of the United States, residing at Oglesby, in the county of Coryell and State of Texas, have invented certain new and useful Improvements in Cotton-Chopping Attachments for Cultivators, of which the following is a specification.

In the raising of cotton it is common to sow the seed in rows and after the plants have acquired a determinate growth to thin the rows by chopping or otherwise destroying the plants between those selected to reach maturity. This work has usually been either accomplished by hand or special machinery.

This invention provides an attachment to be connected at will to a cultivator or other agricultural implement for thinning the rows of cotton-plants and which attachment is adjustable to admit of varying the distance between the plants left standing according to conditions of soil and climate. In its present adaptation the attachment as illustrated is designed for use in connection with a cultivator, thereby admitting of thinning the rows and cultivating the plants at one operation.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of the invention, showing it coupled to a wheel-cultivator. Fig. 2 is a longitudinal section of the clutch between the drive-wheels and drive-shaft. Fig. 3 is a transverse section on the line X X of Fig. 2 looking in the direction of the arrow. Fig. 4 is a perspective view of the attachment. Fig. 5 is a detail perspective view of the adjustable mountings of a fender. Fig. 6 is a top plan view of the attachment. Fig. 7 is a perspective view of a toothed segment, the pinion coöperating therewith, and the means for preventing movement of the drive-wheel when disconnected from said pinion, the parts being separated and arranged in a group. Fig. 8 is a section on the line Y Y of Fig. 6, looking in the direction of the arrows, with the parts in the rear of the bail omitted. Fig. 9 is a detail view of the drive-wheel and adjunctive parts on the line Z Z of Fig. 6, showing the parts on a larger scale. Fig. 10 is a sectional view of the bracket, to which a side spacer is attached, and the side bar, to which said bracket is adjustably connected.

Corresponding and like parts are referred to in the following description and indicated in all the views of the drawings by the same reference characters.

The cultivator shown is of the wheel type and is of ordinary construction, and is illustrated to demonstrate the manner of coupling the attachment thereto when required for service. The cultivator comprises the main frame 1, arch 2, to which the bars 3, provided with the cultivator-teeth 4, are coupled, arched axle 5, and ground-wheels 6. The attachment is clipped or otherwise secured to the arch 2 and is adapted to be raised and lowered by means of the lever 7, fulcrumed upon the main frame 1 of the cultivator and provided with coöperating latch-bolt 8 and toothed segment 9 for holding the lever and attachment in the adjusted position.

The attachment comprises side bars 10 and a transverse connecting-bar 11, shafts 12 and 13 being journaled to the side bars 10 at opposite ends. The side bars 10 are jointed at 14 to admit of the rear portion of the attachment being moved laterally, as may be required in the operation of the machine. A clevis 15 is located near each end of the shaft 12 and is adapted to be clipped or otherwise fastened to the vertical members of the arch 2. The lower end of each clevis is widened and provided with a series of openings 16 to admit of adjusting the attachment when fitting it to the cultivator.

The shaft 12 is the drive-shaft and receives power direct from one of the ground-wheels 6 and for this purpose is provided with a sprocket-wheel 17, around which passes a sprocket-chain 18, deriving motion from a sprocket-wheel 19, secured to the hub or spokes of the ground-wheel from which the power is taken. A drive-wheel 20 is mounted upon the drive-shaft 12 and is connected thereto by a suitable clutch, so as to admit of the chopper mechanism being thrown out of gear at will. The preferred form of clutch is shown most clearly in Fig. 2, and consists of a sleeve 21, secured to the drive-shaft 12 and having grooves 22 upon its inner side to receive corresponding ribs 23 at the sides of the hub 24 of the drive-wheel 20. A spring 25, located within the sleeve 21, exerts a lateral pressure upon the drive-wheel 20, so as to hold said drive-wheel in engagement with the pinion 29 at the front end of the longitudinal shaft 30. A collar 26 is secured upon the drive-wheel 20, and a short distance from the drive-wheel 20, and a wedge 27 is interposed between the drive-wheel and collar and is slotted to receive the drive-shaft upon which it is mounted. A rod or analogous connection 28 is interposed between the wedge 27 and the operating-lever 7, so that simultaneously with elevating the attachment the operating mechanism is thrown out of gear. A bail 31 is secured to the side bars 10, and a chain or analogous connection 32 is interposed between it and the operating-lever 7, and upon lifting the rear end of said operating-lever the attachment is turned upon the drive-shaft 12, thereby lifting the chopping mechanism and fenders out of contact with the ground and at the same time throwing the operating mechanism out of gear by means of the wedge 27 in the manner stated.

The longitudinal shaft 30 is mounted in bearings at the inner ends of the arms 33 and in the cross-bar 11 and is provided at its front end with the pinion 29 and at its rear end with a corresponding pinion 34, which is in mesh with a gear-wheel 35, secured to the shaft 13. A gimbal or like joint 36 is formed in the shaft 30 in line with the joints 14 of the side bars 10 to admit of lateral movement of the rear portion of the attachment. The drive-wheel 20 is provided with cog-teeth 37 for coöperation with the pinion 29 to impart rotary movement to the shaft 30. The cog-teeth 37 are not continuous. Hence the shaft 30 receives an intermittent rotation. In order to admit of regulating the relative movement between the drive-shaft 12 and the power-transmitting shaft 30, the cog-teeth 37 are provided in the form of a segment which is adapted to be secured to the drive-wheel 20 at any position. The segments 37 may embody any number of teeth, and one or more segments may be secured to the drive-wheel, according to the space to be provided between the plants left standing in the rows. Any means may be employed for connecting the toothed segments 37 to the drive-wheel and for convenience wood-screws are preferred, the drive-wheel being preferably of cast-iron and the segments being attached thereto at any determinate position.

To prevent overthrowing of the shaft 30 and to hold the latter and the chopping mechanism in proper position, suitable detent mechanism is provided, and, as illustrated, a dog 38 is pivoted at one end to a side bar 10 and its inner end is shouldered at 39 and is formed with an extension 40, which overlaps a plate 41, secured upon the shaft 30 and having an extension 42 to abut against the shoulder 39. The extension 40 constitutes a trip and extends into the path of a tappet 43, provided upon the drive-wheel and located just in advance of the cog-teeth 37, so as to release the dog 38 from the part 42 an instant prior to contact of the teeth 37 with the teeth of the pinion 29. The extension 42 and the shoulder 39 form, in effect, a stop mechanism. In the preferable construction the plate 41 is formed with the pinion 29 and the tappet 43 is formed with the toothed segment 37, thereby obviating the formation of joints which are liable to work loose and require special attention. A spring 44 normally exerts a pressure upon the dog 38 to cause the trip 40 to remain in contact with the plate 41. The instant the teeth 37 clear the pinion 29 the extension or stop 42 comes in position opposite to the shoulder 39 and is engaged thereby to hold the shaft 30 and chopping mechanism in proper position.

The chopping mechanism consists of arms 45, attached at their inner ends to a hub 46, secured upon the shaft 13 and provided at their outer ends with blades 47. The arms 45 are preferably curved. The number of arms 45 and blades 47 may be varied according to the general construction of the attachment. The chopping mechanism is intermittently rotated and a blade thereof is held in contact with the ground by the stop mechanism herein described, and when said mechanism is released and the shaft 30 rotated the chopping mechanism is moved a distance to bring the next blade into position and is held in place during its operation by said stop mechanism in the manner stated.

To centralize the rear portion of the attachment with reference to the side bars 3 of the cultivator, spacers 48 have adjustable connection with the side bars 10 and are located near the rear ends thereof. The spacers 48 are approximately of V form and are resilient, so as to admit of a limited lateral movement of the cultivator and attachment, which would not be the case if the spacers were rigid. The outer members of the spacers 48 are outwardly curved at their upper ends, as shown at 49, so as to overhang the bars 3 and prevent vertical displacement of the cultivator and attachment, but yet admitting of a limited vertical and lateral movement. Each spacer is constructed of a bar bent between its ends into an approximately V form, the inner member of each spacer having a lateral extension 50, which is adjustably connected to a bracket 51, secured to the side bar 10. The spacers 48 have a twofold adjustment, the one laterally and the other in an arcuate path. This latter adjustment is effected by having the inner member of the bracket 51 vertically slotted and curved to fit against the rounded side of the bar 10, to which it is bolted.

The fenders are carried by spring-bars 52, which are secured at their front ends to the side bars 10. A block 53 is secured to each spring-bar 52 and is adjustable thereon to admit of varying the position of the fender. The upper side of the block 53 is transversely curved. A plate 54, provided with a shank 55, is adjustably connected to the block 53 by means of the bolt or fastening 56, passed through a slot 57 in the shank 55. The manner of mounting the plate 54 admits of its adjustment along the bar 52 and angularly, so as to regulate the lateral pitch or inclination of the fender as may be desired. Each fender consists of a plate 58 and a standard 59, the latter being pointed at its lower end and having adjustable pivotal connection near its upper end with the plate 54. A spring 60 connects the upper end of the standard 59 with a post 61, adjustable upon the bar 52 to admit of varying the tension of the spring 60 or accommodating its position to that of the fender. The spring 60 exerts a rearward pull upon the upper end of the standard 59 and normally tends to hold the lower end of the standard and the fender-plate 58 forward. The normal position of the standard 59 is determined by means of a pin 62, which is inserted in one of a series of openings 63, formed in the plate 54.

A trip mechanism coöperates with each of the fenders and spring-bars 52, and consists of a stop 64 and arms 65, provided at their outer ends with rollers 66 and connected at their inner ends to hubs secured to the shaft 13. The stops 64 consist of plates and are adjustably connected to the bars 52. In the rotation of the shaft 13 the arms 65 are correspondingly moved and coming in contact with the stops or plates 64 elevate the rear portion of the bars 52 a distance to cause the lower ends of the standards 59 to clear the ground when the springs 60 come into play to throw the lower ends of the standards forward. At this instant the arm 65 in contact with the stop 64 clears the latter and the bars 52 descending at their rear ends cause the points of the standards 59 to enter the ground, and in the forward movement of the machine the standards turn upon their pivotal connection with the plates 54 by reason of the contact of the lower ends of the standards with the ground. As the standards 57 turn the springs 60 are subjected to increased tension, and at the proper time when the succeeding arm 65 comes in contact with the stop 64 and the rear portion of the bar 52 is elevated to withdraw the standard from the ground the spring 60 regaining itself returns the fender or standard bearing the plate 58 to a normal position. The fender is arranged with reference to the plants and the proximal cultivator-shovels, so as to enter the ground at a point about opposite to the plant left standing a short distance in advance of the cultivator, thereby protecting the plant from injury and at the same time preventing the cultivator from throwing earth upon the plant and covering the same.

When the attachment is coupled to a cultivator or analogous agricultural implement and the same is drawn over the field, rotary movement is imparted to the drive-shaft 12 through the connecting means interposed between said shaft and the rotating part of the machine to which the attachment is coupled. When the cog-teeth 37 of the drive-wheel 20 engage with the teeth of the pinion 29, the shaft 30 is rotated and through the gearing 34 and 35 the shaft 13 is correspondingly revolved and moves the chopping and trip mechanisms attached thereto. After the chopping-blade has been brought into position, which occurs the instant the teeth 37 clear the pinion 29, the stop 42 is engaged by the shoulder 39 of the dog 38, thereby holding the shaft 30 and chopping mechanism against further movement until the trip 40 is engaged by the tappet 43 of the next set of teeth 37, when the operation is repeated. Upon operating the lever 7 to elevate the chopping and tappet mechanisms the operating mechanism of the attachment is thrown out of gear by the action of the wedge 27 in the manner stated.

Having thus described the invention, what is claimed as new is—

1. In combination with an agricultural implement of the cultivator type, an attachment provided with mechanism for thinning the rows of cotton-plants, and spacers at the sides of the attachment for properly positioning the same between the longitudinal bars of the agricultural implement, substantially as set forth.

2. In combination, an agricultural implement of the cultivator type, an attachment provided with mechanism for thinning the rows of cotton-plants, means for coupling the attachment to the implement, and spacers projected from the sides of the attachment and having their outer portions upwardly and outwardly inclined to engage with the longitudinal bars of the agricultural implement and properly position the attachment, substantially as set forth.

3. In combination, an agricultural implement of the cultivator type, an attachment provided with mechanism for thinning the rows of cotton-plants, means for coupling the attachment to the implement, and spacers projected from the sides of the attachment and having their outer portions upwardly and outwardly inclined and terminating in outer projections to engage over the longitudinal bars of said agricultural implement, substantially as specified.

4. In combination, an agricultural implement of the cultivator type, an attachment provided with mechanism for thinning the rows of cotton-plants, means for coupling the attachment to the implement, and spacers projected from the sides of the attachment and having their outer portions made resilient so as to yield and normally exert a lateral pressure upon the longitudinal bars of the agricultural implement, substantially as set forth.

5. In combination, an agricultural implement of the cultivator type, an attachment provided with mechanism for thinning the rows of cotton-plants, means for coupling the attachment to the implement, and spacers of approximately V form connected to the sides of the attachment and adapted to engage with the longitudinal bars of the agricultural implement, substantially as specified.

6. In combination, an agricultural implement of the cultivator type, an attachment provided with mechanism for thinning the rows of cotton-plants, means for coupling the attachment to the implement, spacers at the sides of the attachment, and means for adjustably connecting said spacers to the attachment, substantially as described.

7. In combination, an agricultural implement of the cultivator type, an attachment provided with mechanism for thinning the rows of cotton-plants, means for coupling the attachment to the implement, spacers, and means for connecting the spacers to the attachment and admitting of angular adjustment of the spacers, substantially as set forth.

8. In combination, an agricultural implement of the cultivator type, an attachment provided with mechanism for thinning the rows of cotton-plants, means for coupling the attachment to the implement, spacers, and means adjustably connecting the spacers to the attachment to admit of both lateral and angular adjustment of said spacers, substantially as specified.

9. In combination, an attachment comprising front and rear portions pivotally connected, means applied to the front portion for coupling the same to an agricultural implement, and yielding spacers applied to the rear portion of the attachment and arranged at the sides thereof to come between the attachment and longitudinal bars of the machine to which the attachment is coupled, substantially as set forth.

10. In combination, a rotary chopper for thinning the rows of cotton-plants, a driver, power-transmitting means between said driver and chopper for operating the latter intermittently, and a stop or detent mechanism for positively holding the chopper during the intervals between the periods of movement, substantially as set forth.

11. In combination, a driver, a rotary chopper, power-translating means between the driver and chopper for operating the latter intermittently, a stop mechanism for positively holding the said chopper during its periods of rest, and means actuated by said driver for releasing the stop mechanism prior to imparting movement to the rotary chopper, substantially as set forth.

12. In combination, a driver, a rotary chopper, power-translating means between the driver and chopper for operating the latter intermittently, a stop mechanism for positively holding the said chopper during its periods of rest, and a tappet carried by said driver and arranged to release the stop mechanism prior to positive connection being effected between said driver and the power-translating mechanism, substantially as set forth.

13. In combination, a rotary driver, a rotary chopper, power-translating means between the rotary chopper and said driver including a pinion, cog-teeth carried by said driver and adapted to intermesh with the teeth of said pinion, a stop mechanism for holding the power-translating means against forward movement after the cog-teeth have cleared said pinion, and a tappet projected from the driver to effect release of said stop mechanism prior to engagement of said cog-teeth with the pinion, substantially as set forth.

14. In combination, a rotary driver, a rotary chopper, power-translating means between the rotary chopper and said driver including a pinion, cog-teeth carried by said driver and adapted to intermesh with the teeth of said pinion, a stop forming a part of said pinion, a dog for coöperating with said stop, and a tappet projected from the driver and adapted to disengage the dog from the stop preliminary to engagement of the cog-teeth with the pinion, substantially as set forth.

15. In combination, a rotary driver, a rotary chopper, power-translating means between the rotary chopper and said driver including a pinion, cog-teeth carried by said driver and adapted to intermesh with the teeth of said pinion, a stop mechanism coöperating with the power-translating mechanism to hold the latter stationary during the interval between disengagement of said cog-teeth from the pinion, and a tappet forming a part of the cog-teeth and adapted to effect a release of the stop mechanism prior to engagement of the said cog-teeth with the pinion, substantially as specified.

16. In combination, a rotary driver, a rotary chopper, power-translating means between the rotary chopper and said driver including a pinion, cog-teeth carried by said driver and adapted to intermesh with the teeth of said pinion, a stop connected with the power-translating mechanism, a dog for engagement with said stop and having an extension forming a trip, and a tappet projected from the driver to come in contact with said trip and effect release of the dog from the stop prior to engagement of the cog-teeth with the pinion, substantially as described.

17. In combination, a chopper mechanism, operating means therefor including a shaft, driver and clutch mechanism, a wedge slidably mounted upon the shaft, means mounted upon the shaft for limiting the movement of said wedge in one direction, and actuating means for said wedge to effect unshipping of the power-transmitting mechanism, substantially as set forth.

18. In combination, a chopper mechanism, operating means therefor including a shaft, driver and clutch mechanism, a wedge slidably mounted upon said shaft, means mounted upon the shaft for limiting the movement of said wedge in one direction, an operating-lever for raising and lowering the chopper mechanism, and connecting means between said operating-lever and wedge to effect simultaneous movement of the latter with lifting of the chopper mechanism, substantially as described.

19. In combination, a cultivator, chopping means for thinning the rows of cotton-plants, fenders arranged to come upon opposite sides of the plants left standing, and means for intermittently lifting said fenders, substantially as described.

20. In combination, a cultivator, chopping means for thinning the rows of cotton-plants, fenders arranged to come upon opposite sides of the plants left standing and mounted for pivotal movement, means for throwing said fenders forward, and means for intermittently elevating said fenders to disconnect them from the ground, substantially as set forth.

21. In combination, a cultivator, chopping means for thinning the rows of cotton-plants, fenders arranged to come upon opposite sides of the plants left standing and mounted for pivotal movement, means for regulating the forward movement of the fenders, spring means for normally holding the fenders forward, and means for lifting the fenders to disengage them from the ground, substantially as set forth.

22. In combination, a cultivator, chopping means for thinning the rows of cotton-plants, fenders arranged to come upon opposite sides of the plants left standing and adjustable toward and from the chopper mechanism, means for securing the fenders in an adjusted position, and means for elevating the fenders to effect their disengagement from the ground at any adjusted position, substantially as set forth.

23. In combination, a cultivator, chopping means for thinning the rows of cotton-plants, fenders arranged to come upon opposite sides of the plants left standing, a support for each fender to admit of varying its lateral inclination, means for securing the fender in the adjusted position, and means for disconnecting the fenders from the ground, substantially as set forth.

24. In combination, a cultivator, chopping means for thinning the rows of cotton-plants, fenders arranged to come upon opposite sides of the plants left standing, plates having the fenders pivotally connected thereto, stops adjustable upon the plates to limit the forward movement of the fenders, springs for holding the fenders in normal position, and means for disconnecting the fenders from the ground, substantially as set forth.

25. In combination, a cultivator, chopping means for thinning the rows of cotton-plants, fenders arranged to come upon opposite sides of the plants left standing, vertically-movable supports for the fenders and having stops, and tappets connected with the chopper mechanism and rotatable therewith to effect vertical movement of the fenders, substantially as specified.

26. In combination, a framework comprising side bars, a chopper mechanism for thinning the rows of cotton-plants, spring-bars extended from said side bars, fenders carried by the spring-bars and arranged to come upon opposite sides of the plants, and a trip mechanism to effect vertical movement of said spring-bars to disconnect the fenders carried thereby from the ground, substantially as set forth.

27. In combination, a framework comprising side bars, a chopper mechanism for thinning the rows of cotton-plants, spring-bars extended from said side bars, fenders adjustable upon said spring-bars, spring means for normally throwing the fenders forward, stops upon the spring-bars, and means supported by the side bars of the framework and connected with the chopper mechanism to rotate therewith and adapted to engage with the stops of the spring-bars to move the latter and elevate the fenders, substantially as set forth.

In testimony whereof I affix my signature in presence of two witnesses.

MARTIN A. JONES. [L. S.]

Witnesses:
D. M. JORDAN,
B. A. McKELVAIN.